US012660810B2

(12) United States Patent　　　　　(10) Patent No.:　US 12,660,810 B2

Bruxelle et al.　　　　　　　　　　　　(45) Date of Patent:　Jun. 23, 2026

(54) CLIMBING TREE PLATFORM DEVICES AND CLIMBING TREE STAND SYSTEMS

(71) Applicant: Osprey Outdoors LLC, Plymouth, MN (US)

(72) Inventors: Charles-Henri Hubert Bruxelle, Plymouth, MN (US); James Earle Harvey, III, Red Lion, PA (US)

(73) Assignee: Osprey Outdoors LLC, Plymouth, MN (US)

( * ) Notice:　Subject to any disclaimer, the term of this patent is extended or adjusted under 35 U.S.C. 154(b) by 433 days.

(21) Appl. No.: 18/241,623

(22) Filed:　Sep. 1, 2023

(65)　　　　　Prior Publication Data

US 2024/0074431 A1　　Mar. 7, 2024

Related U.S. Application Data

(60) Provisional application No. 63/403,895, filed on Sep. 6, 2022.

(51) Int. Cl.
　　*A63B 27/00*　　　(2006.01)
　　*A01M 31/02*　　　(2006.01)
(52) U.S. Cl.
　　CPC ................................... *A01M 31/02* (2013.01)
(58) Field of Classification Search
　　CPC ..... A01M 31/02; A01M 31/025; A63B 27/00; A63B 27/02; A63B 27/04
　　See application file for complete search history.

(56)　　　　　References Cited

U.S. PATENT DOCUMENTS

| | | | |
|---|---|---|---|
| 3,460,649 A | 8/1969 | Baker et al. | |
| 3,955,645 A | 5/1976 | Dye | |
| 4,595,076 A | 6/1986 | Gober | |
| 4,687,074 A | 8/1987 | Green | |
| 4,723,630 A | 2/1988 | Wolford et al. | |
| 4,809,815 A | 3/1989 | Wallace | |
| 4,890,694 A | 1/1990 | Williams | |
| 4,921,069 A | 5/1990 | Boyles | |
| 4,969,538 A | 11/1990 | Amacker | |
| 5,143,177 A * | 9/1992 | Smith ................... | A01M 31/02 |
| | | | 182/136 |
| 5,226,505 A | 7/1993 | Woller et al. | |
| 5,234,076 A | 8/1993 | Louk et al. | |
| 5,417,306 A | 5/1995 | Robl | |
| 5,515,943 A | 5/1996 | Antonelli | |

(Continued)

OTHER PUBLICATIONS

"Lone Wolf Alpha Hand Climber Treestand", Instructions Manual, retrieved from the Internet: <https://www.manualslib.com/manual/1819278/Lone-Wolf-Alpha-Hand-Climber.html> Nov. 2023 (62 pages).

(Continued)

*Primary Examiner* — Kristen C Hayes
(74) *Attorney, Agent, or Firm* — Dicke, Billig & Czaja, PLLC

(57)　　　　　ABSTRACT

A climbing platform device useful for enabling a user to climb a tree. The climbing platform device includes a platform, first and second arms, a cable, and a post. The arms and the post are connected to the platform. The cable is extendable between the arms. In a climbing state, the cable loosely secures the platform to a tree trunk, permitting a user to climb the tree.

20 Claims, 8 Drawing Sheets

(56)  References Cited

U.S. PATENT DOCUMENTS

| | | | | | |
|---|---|---|---|---|---|
| 5,862,883 | A * | 1/1999 | Carriere | ................ | A01M 31/02 |
| | | | | | 182/135 |
| 6,085,868 | A * | 7/2000 | Anthony | .............. | A01M 31/02 |
| | | | | | 182/187 |
| 6,264,000 | B1 * | 7/2001 | Johnson | ................ | A01M 31/02 |
| | | | | | 182/136 |
| 6,308,801 | B1 | 10/2001 | Futch | | |
| 6,568,505 | B1 | 5/2003 | D'Acquisto | | |
| 6,588,546 | B1 * | 7/2003 | Forrest | ................. | A01M 31/02 |
| | | | | | 182/135 |
| 6,715,585 | B1 | 4/2004 | Overbaugh | | |
| 6,722,472 | B2 * | 4/2004 | Berkbuegler | ......... | A01M 31/02 |
| | | | | | 182/135 |
| 6,986,404 | B1 | 1/2006 | Laborde | | |
| 6,988,588 | B2 | 1/2006 | Prejean | | |
| 9,089,125 | B1 | 7/2015 | Fast | | |
| 9,737,070 | B1 * | 8/2017 | Quiring | ................. | A63B 27/00 |
| 10,791,729 | B1 | 10/2020 | Power, II et al. | | |
| 2007/0227818 | A1 | 10/2007 | Bedell | | |
| 2008/0156586 | A1 | 7/2008 | Pestrue | | |
| 2011/0132686 | A1 | 6/2011 | Priest | | |
| 2014/0166400 | A1 * | 6/2014 | Berkbuegler | ......... | A01M 31/02 |
| | | | | | 182/222 |
| 2014/0190767 | A1 | 7/2014 | Wheelington | | |
| 2015/0296769 | A1 | 10/2015 | Rebone | | |
| 2017/0265454 | A1 | 9/2017 | Kramer | | |
| 2025/0052363 | A1 * | 2/2025 | McCharles | ........... | F16M 13/02 |
| 2025/0275530 | A1 * | 9/2025 | Clark | .................... | A63B 27/00 |

OTHER PUBLICATIONS

"X-Stand Tree Stand The Apache Climbing Treestand", retrieved from the Internet: <https://www.deguns.net/x-stand-tree-stand-the-apache-climbing-treestand> Nov. 2023 (4 pages).

* cited by examiner

CLIMBING TREE PLATFORM DEVICES AND CLIMBING TREE STAND SYSTEMS

CROSS-REFERENCE TO RELATED APPLICATIONS

This U.S. Patent application claims the benefit of the filing date of U.S. Provisional Patent Application Ser. No. 63/403,895, filed Sep. 6, 2022, the entire teachings of which are incorporated herein by reference.

BACKGROUND

The present disclosure relates to tree stands. More particularly, it relates to portable climbing tree stand devices and climbing tree stand systems.

Tree stands of various types are commonly used by hunters, other outdoor enthusiasts, and professionals to attain an elevated position above the ground. Fixed-type or ladder tree stands are intended to be robustly secured to a tree (e.g., permanently mounted for weeks or months), and often provide a well-sized chair and foot platform (or similar seating features) that allow a user to sit comfortably while on the stand. In addition, fixed tree stands require or come with a ladder. Due to the size and weight of the stand itself as well as the requisite ladder, fixed tree stands are not portable. Other, more mobile, tree stand designs are available. For example, hang-on or lock-on tree stands attach to the tree using a chain or ratchet strap. Climbing sticks or a similar step-type device is required for ascending/descending the tree. Climbing tree stands typically include two major components: a top portion that serves as a seat and a bottom portion that serves as a foot platform. The two portions are separated from one another, and each provide features that allow a user to climb the tree using the stand itself; ladders or steps are not required. In more general terms, then, climbing tree stands are a two-piece system while non-climbing tree stands are usually a one piece device that further requires additional implements to ascend/descend the tree (e.g., steps, ladder, etc.). More recently, so-called "tree saddles" or "tree slings" have gained popularity with avid hunters, and generally include a harness or sling assembly. When using this type of device, the user is tasked with climbing the tree with a separate climbing aid such as climbing sticks, rope-style step ladder, etc., and will then use a platform or steps to hold part of their weight when reaching a desired elevation. The harness assembly is first tethered to the tree, and has a hammock-like "saddle" that is secured to the user's waist. The climbing aid is then installed to the tree trunk, followed by the user ascending the climbing aid while carrying the platform in a backpack or the like. Once the user has climbed to a desired height, the platform (if used) can be carefully secured to the tree while the user hangs from the saddle. Once installed, the platform provides a stable surface for the user's feet. While tree saddles are portable, the required climbing aid can be cumbersome to carry and take time to install to, and remove from, the tree trunk.

The available tree stands (and tree saddles) described above may be well-suited for many users. However, for certain users, for example avid hunters, drawbacks remain, for example in terms of mobility, ease of use, and cost. Additionally, hunting accidents happen each year by lack of visibility and giving the ability to more hunters to hunt from elevated positions could make them more visible while making their shot safer by improving odds for shots to get in the ground versus ricochet.

DETAILED DESCRIPTION

Figure 1:
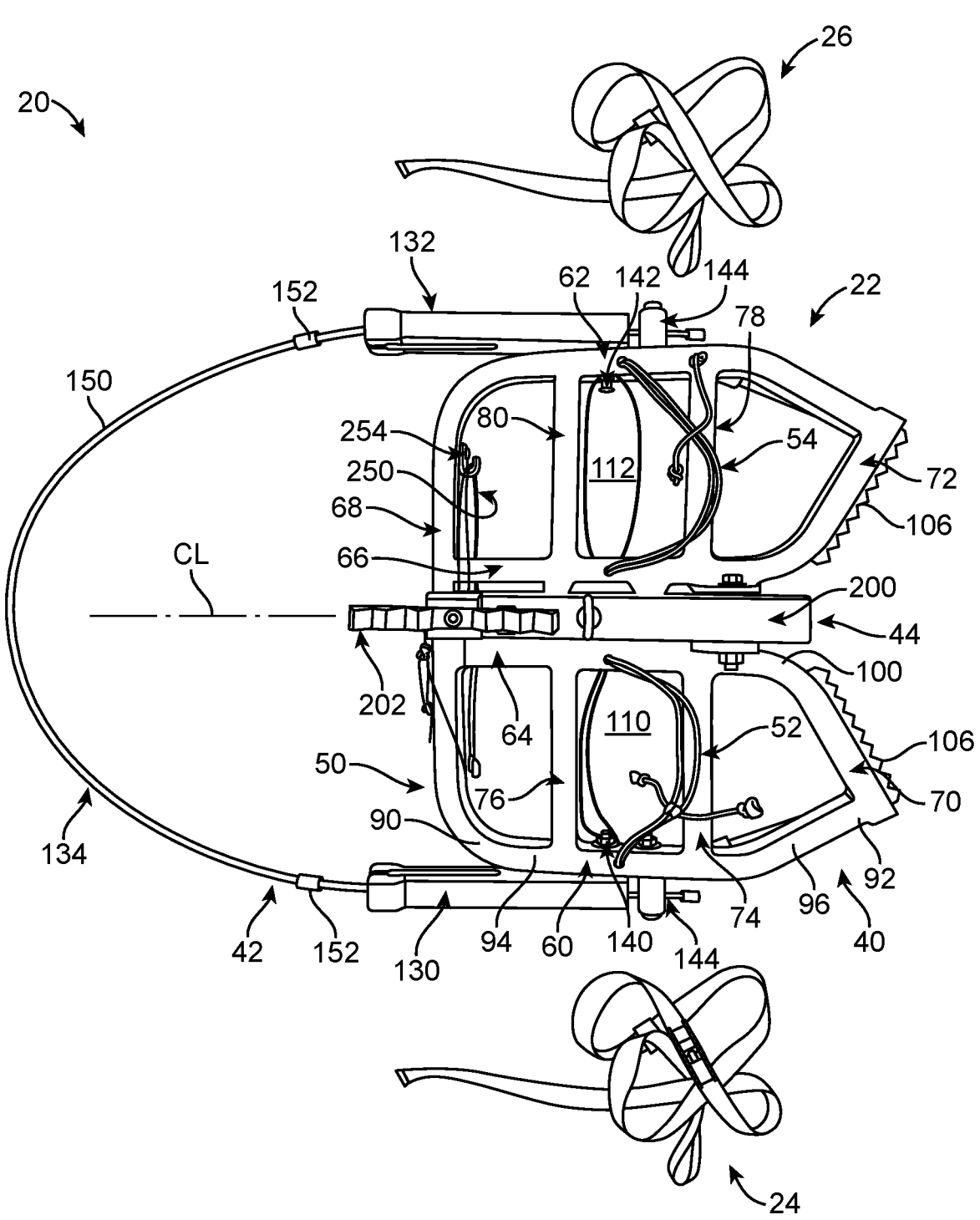
FIG. 1 is a top view of a climbing tree stand system in accordance with principles of the present disclosure and including a climbing platform device in a stowing state.
Figure 2:
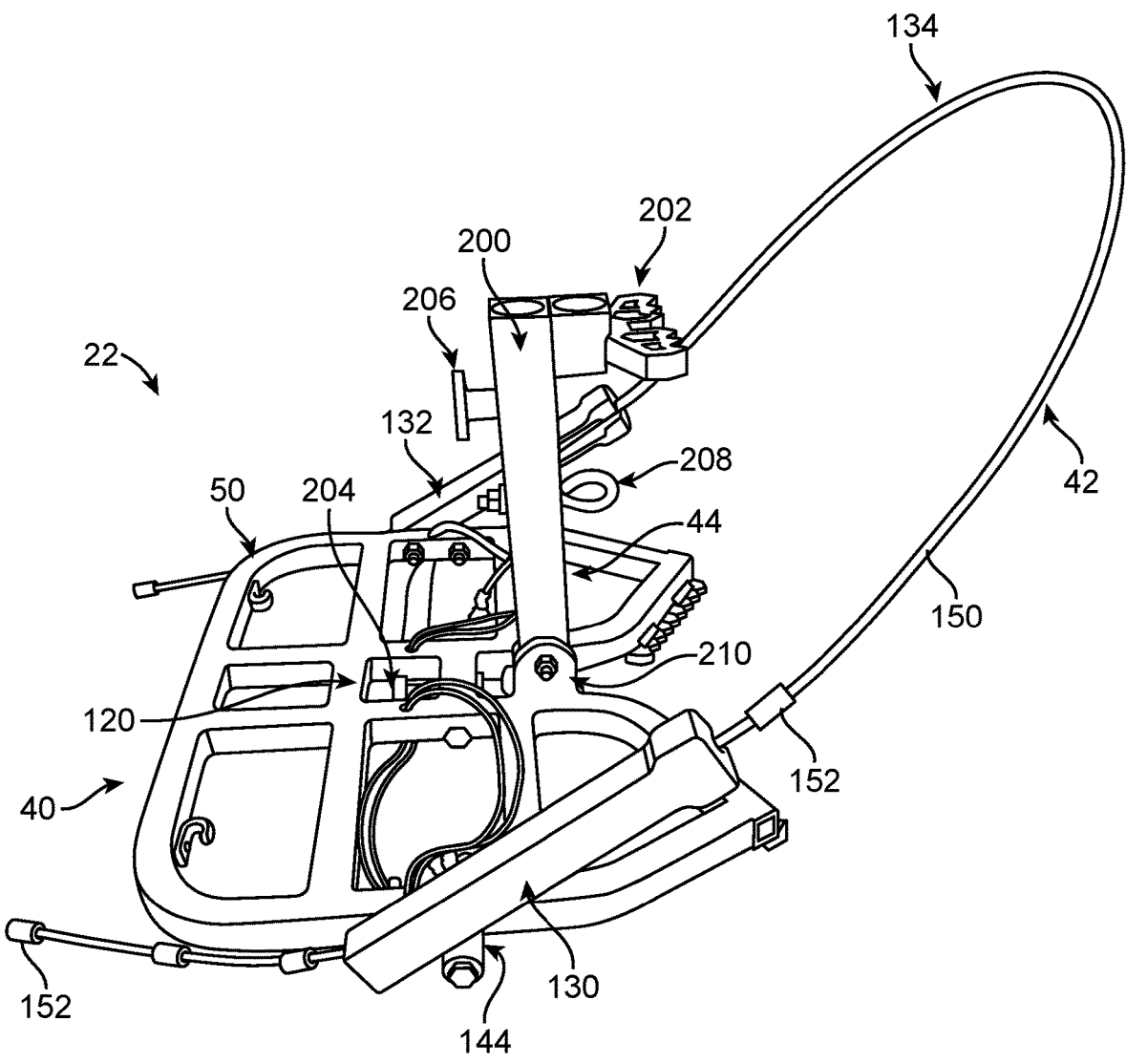
FIG. 2 is a perspective view of the climbing platform device of the system of FIG. 1 in a mounting state.

Some aspects of the present disclosure relate to a climbing platform device useful as part of a climbing tree stand system. One example of a climbing tree stand system 20 of the present disclosure is shown in FIG. 1, and includes a climbing platform device 22 and one or more securing lines or similar devices 24, 26. Details on the various components are provided below. In general terms, the climbing platform device 22 can be considered a one-piece device and is configured to be transitionable between various arrangements, including a stowing state, a climbing state, and a mounting state. The stowing state is reflected by FIG. 1, and is characterized by components of the climbing platform device 22 being folded or compactly arranged relative to one another in a manner that facilitates convenient transport. The climbing platform device 22 is configured to be connected to a tree or the like in the climbing and mounting states. In the climbing state, the climbing platform device 22 is operable by a user to ascend or descend the tree without a separate ladder or step device as described below. An example of the mounting state is shown in FIG. 2. While in the mounting state, the climbing platform device 22 can be more completely secured to a tree trunk or the like by the securing line(s) 24, 26 (e.g., straps, ropes, cords, wires, belts, etc.) or any other applicable securing system as described below. Once secured to a tree trunk, the climbing platform device 22 provides a rigid surface for the feet of the user who is otherwise connected to the tree by a harness. The climbing platform devices and climbing tree stand systems of the present disclosure are highly portable, easy to use, and allow a user to climb trees with a single lightweight element. In some non-limiting examples, a harness device or system (not shown) is recommended and can be employed by a user while climbing with/using the climbing platform device 22.

With reference to FIGS. 1 and 2, the climbing platform device 22 includes a platform assembly 40, a trunk capture assembly 42 (referenced generally), and a post assembly 44. The trunk capture assembly 42 and the post assembly 44 can articulate relative to the platform assembly 40 to provide the stowing, climbing and mounting states.

The platform assembly 40 includes a platform 50 and foot hold members 52, 54 (omitted from the view of FIGS. 4A-4C but shown, for example, in FIG. 1). The platform 50 can assume various forms, and includes framework that collectively defines a centerline CL and provides a rigid support region for receiving and supporting the feet of a user. For example, the platform 50 framework can include opposing, outer lateral frame members 60, 62, one or more intermediate lateral frame members, such as first and second intermediate lateral frame member 64, 66, a trailing cross frame member 68, one or more leading cross frame members, such as first and second leading cross frame members 70, 72, and one or more intermediate cross frame members, such as intermediate cross frame members 74, 76, 78, 80. The frame members 60-80 can have a similar format in some embodiments (e.g., square or other cross-sectional shaped metal tubes, solid shafts, etc.).

The outer lateral frame members 60, 62 can have an identical shape and size in some embodiments, each extending from a trailing end 90 to a leading end 92 (labeled in FIG. 1 for the first outer lateral frame member 60). In some embodiments, a shape of each of the outer lateral frame members 60, 62 defines a trailing segment 94 and a leading segment 96. The trailing segment 94 extends from the trailing end 90 in a substantially straight or linear fashion (i.e., within 10 percent of a truly linear shape). The leading segment 96 extends from the trailing segment 94 to the leading end 92. In this regard, a bend can be formed at a transition from the trailing segment 94 to the leading segment 96 such that the leading segment 96 projects toward the centerline CL in extension to the leading end 92. In other words, axes of the trailing and leading segments 94, 96 combine to define an included angle of less than 180 degrees, locating the leading end 92 closer to the centerline CL as compared to the corresponding trailing end 90 in some embodiments. In other embodiments, the outer lateral frame members 60, 62 can define a variety of other shapes, and the trailing and leading ends 90, 92 need not necessarily be off-set from one another relative to the centerline CL.

The trailing cross frame member 68 intersects and extends between the outer lateral frame members 60, 62 at the corresponding trailing ends 90. The first and second intermediate lateral frame member 64, 66 are transversely spaced from one another, extending from the trailing cross frame member 68 in proximity to, but at opposite sides of, the centerline CL. With this arrangement, the first outer lateral frame member 60 and the first intermediate lateral frame member 64 are positioned at one side of the centerline CL, and the second outer lateral frame member 62 and the second intermediate lateral frame member 66 are positioned at the opposite side of the centerline CL. The intermediate lateral frame members 64, 66 can be substantially identical in terms of at least size and shape. For example, the intermediate lateral frame members 64, 66 can be substantially straight or linear in extension from the trailing cross frame member 68 (and substantially parallel with the centerline CL). The intermediate lateral frame members 64, 66 each terminate at a forward end 100 (labeled in FIG. 1 for the first intermediate lateral frame member 64) opposite the trailing cross frame member 68. In some embodiments, a linear length of each of the intermediate lateral frame members 64, 66 is less than the linear length of each of the outer lateral frame members 60, 62. This but one acceptable configuration arranges the forward ends 100 to be linearly off-set from the leading ends 92 (e.g., the leading end 92 of the first outer lateral frame member 60 is longitudinally beyond the forward end 100 of the first intermediate lateral frame member 64 (relative to the trailing cross frame member 68)) for reasons made clear below.

The first leading cross frame member 70 extends between and interconnects the first outer lateral frame member 60 and the first intermediate lateral frame member 64 at the respective leading and forward ends 92, 100. Due to the off-set arrangement of the leading end 92 relative to the forward end 100, an axis defined by the first leading cross frame member 70 is non-perpendicular relative to the centerline CL in some embodiments. The second leading cross frame member 72 can have a highly similar format and arrangement, extending between and interconnects the second outer lateral frame member 62 and the second intermediate lateral frame member 66. The leading cross frame members 70, 72 are non-parallel to one another, combining to define an included angle that is approximately centered at the centerline CL and is less than 180 degrees. With this construction, the leading cross frame members 70, 72 are positioned to readily interface with a tree trunk when using the climbing platform assembly 22 as described below. In this regard, and as best seen in FIG. 1, the leading cross frame members 70, 72 can each form or carry a gripping surface 106 at a leading face thereof, configured to grip or "bite" into a surface such as a tree trunk. The gripping surfaces 106 can assume various forms, and in some embodiments include or form a plurality of teeth.

The intermediate cross frame members 74-80 can assume various forms and can be arranged in various locations conducive to receiving and supporting feet of a user. In one example, the first and second intermediate cross frame members 74, 76 extend between and interconnect the first outer lateral frame member 60 and the first intermediate lateral frame member 64. A spacing between the first and second intermediate cross frame members 74, 76 (in a direction of the centerline CL) is selected to be less than a length of a normal adult's foot; with this configuration, a user's foot can be readily place upon, and supported by, both of the first and second intermediate cross frame members 74, 76 during use. Similarly, the third and fourth intermediate cross frame members 78, 80 extend between and interconnect the second outer lateral frame member 62 and the second intermediate lateral frame member 66. A spacing (in a direction of the centerline CL) between the third and fourth intermediate cross frame members 78, 80 can again be selected to accommodate a user's foot. Thus, in some embodiments, the first and second intermediate cross frame members 74, 76 combine to define a first (or right) foot region 110, and the third and fourth intermediate cross frame members 78, 80 combine to define a second (or left) foot region 112.

The platforms of the present disclosure can include or incorporate a number of other framework configurations appropriate for rigidly supporting the weight of a normal human adult are providing surfaces for convenient placement of the user's feet, and is no way limited to the specific construction of FIGS. 1 and 2. Thus, for example, the intermediate cross frame members 74-80 can have formats and/or arrangements that differ from those depicted in the figures that generate or define the first and second foot regions 110, 112. Additional supporting or reinforcing members can also be provided. For example, a reinforcing frame member 120 (e.g., a metal square tube) can extend between and interconnect the first and second intermediate lateral frame members 64, 66 at a location proximate to, but spaced from, the trailing cross frame member 68; an optional reinforcing plate member can be provided at each of the foot regions 110, 112; etc. Regardless, the platform 50 can be manufactured in various fashions as known in the art (e.g., welding metal tubes, casting/molding, CNC parts assembled together, CNC as a single or integral body, etc.).

The foot hold members 52, 54 can assume various forms that facilitate temporary securement of a user's foot to the platform 50 at the corresponding foot region 110, 112. In some non-limiting examples, each of the foot hold members 52, 54 can be or include a strap (e.g., wire, rope, braids, elastic, cloth, etc.) or a piece of hardware (e.g., foot peg, clip, etc.) connected to and extending from one or both of the corresponding intermediate lateral frame members 64, 66 and 68, 70. In some embodiments, the foot hold members 52, 54 are configured to, or provide features that, facilitate tightening/loosening of the foot hold member 52, 54 about or to a user's foot. In some embodiments, the platform assembly 40 can include or carry one more additional features that promote securement of a user's foot to the platform 50. For example, a non-skid material or surface texturing can be applied to or formed by an outer face the platform framework, such as at the intermediate lateral frame members 64-70.

The trunk capture assembly 42 can assume various forms appropriate for selective securement about a tree trunk. In some embodiments, the trunk capture assembly 42 includes a first arm 130, a second arm 132, and a cable 134. The first and second arms 130, 132 are each pivotably connected to the platform 50, and are configured to receive and selectively retain the cable 134. With this construction, a length of the cable 134 extends between the arms 130, 132 and is available for placement about or around a tree trunk. The length of the cable 134 between the arms 130, 132 can be varied as desired so as to accommodate differently-sized (e.g., diameter) tree trunks. Further, the cable 134 can be entirely disconnected from at least one of the arms 130, 132 to facilitate initial assembly and subsequent removal of the climbing platform device 22 to/from a tree trunk.

In some embodiments, the first and second arms 130, 132 can be identical in terms of at least shape and size (e.g., metal square tubes). A pivotable connection between the arms 130, 132 and the platform 50 can be provided in various fashions. In one example, the first arm 130 is located outside of, and is pivotably connected, to the first outer lateral frame member 60 by a bolt mechanism 140 or the like. Similarly, the second arm 132 is located outside of, and is pivotably connected, to the second outer lateral frame member 62 by a bolt mechanism 142 or the like. With this arrangement, the first and second arms 130, 132 can freely rotate relative to the platform 50 about the corresponding bolt mechanism 140, 142. As a point of reference, the views of FIGS. 1 and 2 reflect two possible rotational arrangements of the first and second arms 130, 132 relative to the platform 50, with the first arm 130 rotated to an orientation useful for the climbing and mounting, and the second arm 132 rotated to an orientation useful for storage and/or transport as described below. In some embodiments, the trunk capture assembly 42 can include or provide features that serve as a stop or limit to rotation of the first and second arms 130, 132 in a manner that promotes a tree climbing operation. For example, a shoulder body 144 can be attached to and extend from the first outer lateral frame member 60 at a location selected to prevent the first arm 130 from rotating beyond the rotational position illustrated (i.e., relative to the orientation of FIG. 2, the shoulder body 144 prevents further counterclockwise rotation of the first arm 130 relative to the platform 50) for reasons made clear below. A similar shoulder body 144 can be provided with the second outer lateral frame member 62 to prevent overt rotation of the second arm 132.

The cable 134 includes a cable body 150 and optional anchors 152. The cable body 150 is a flexible, substantially axially inextensible elongated body with sufficient shear stiffness to support the weight of a human adult. For example, the cable body 150 can be a wire or bundle of wires, rope, strap, belt, etc. The anchors 152, where provided, are configured to provide a rigid connection with the arms 130, 132 as described in greater detail below.

Figure 3:
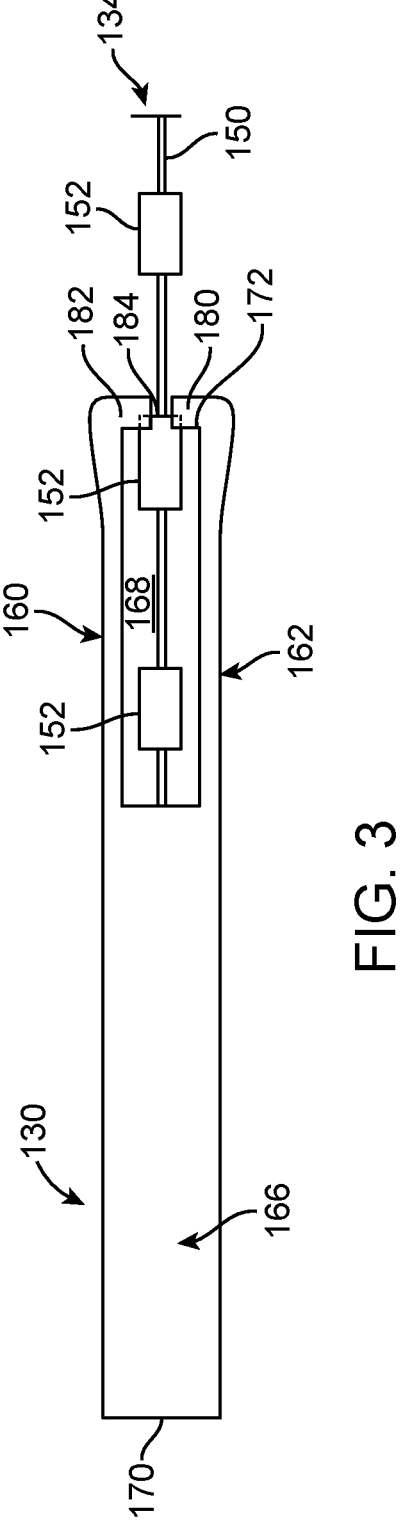
FIG. 3 is an enlarged, simplified side view of a portion of the climbing platform device of FIG. 2.

The trunk capture assembly 42 can include or incorporate various features that facilitate releasable securement of the cable 134 to each of the arms 130, 132 at various locations along a length of the cable body 150. FIG. 3 depicts one non-limiting example as provided with the first arm 130 (it being understood that similar features can be provided with the second arm 132 (FIGS. 1 and 2)). The first arm 130 can include or provide a first side wall 160, a second side wall 162 opposite the first side wall 160, a base wall (not labeled in FIG. 3 for purposes of clarity), and a cover wall 166 opposite the base wall. The walls 160-166 combine to define an open interior region 168 (referenced generally) from a first end 170 to an opposing second end 172. A length of the cover wall 166 in extension from the first end 170 can be less than that of the side walls 160, 162 and the base wall to provide an access opening to the interior region 168. Though not visible in FIG. 3, the first end 170 can also be open to the interior region 168.

Fingers 180, 182 are secured to or formed at the second end 172. The fingers 180, 182 combine to define an open-ended slot 184. A size or height of the slot 184 is less than an outer diameter of each of the anchors 152 that are otherwise formed by or secured to the cable body 150 at axially spaced-apart locations. Conversely, a size or height of the slot 184 is greater than a diameter of the cable body 150. With this construction, the cable body 150 can be inserted into the slot 184 (via the open end of the slot 184) at a desired location that is otherwise spaced from any of the anchors 152. In this regard, a size of the gap between the side walls 160, 162 is greater than an outer diameter of the anchors 152 such that the cable 134 can be readily inserted into the interior region 168. When the cable body 150 is placed into tension (e.g., a pulling force is applied), the cable 134 will axially slide relative to the arm 130 until one of the anchors 152 is brought into contact with, and is captured between, the fingers 180, 182. Because the anchor 152 is larger than the slot 184, the anchor 152 will not pass beyond the fingers 180, 182. This abutting, captured engagement between the anchor 152 and the fingers 180, 182 serves prevents further axial movement of the cable 134 relative to the arm 130. In other examples, an additional device or mechanism (e.g., a locking pin) can be employed to capture or secure the cable 134 relative to the arms 130, 132. While the fingers 180, 182 have been shown as being formed at the second end 172 of the arm 130, any other location is equally acceptable (e.g., at the first end 170). Regardless of an exact design, in some embodiments, the cable 134 can be fully released from at least one of the arms 130, 132 for reasons made clear below (e.g., a size of the opening or gap between the side walls 160, 162 is greater than an outer diameter of the anchors 152).

Returning to FIGS. 1 and 2, the post assembly 44 can assume various forms conducive to rigidly attaching the platform 50 to a tree trunk. In some embodiments, the post assembly 44 includes a post 200, a gripping body 202, a stabilizing mechanism 204, a catch 206, and an optional capture member 208. The post 200 can be a hollow or solid body (e.g., a square metal tube, cast body, etc.) that is pivotably secured to the platform 50, for example via a bolt secured to bracket 210 provided with or assembled to each of the intermediate lateral frame members 64, 66 allowing the post 200 to rotate relative to the platform 50 about the bolt. For example, the post 200 can be rotated relative to the platform 50 between a raised position (e.g., FIG. 2) and a lowered position (e.g., FIG. 1).

The gripping body 202 is carried by the post 200 and includes or provides features configured to intimately engage or "bite" into a tree trunk. For example, the gripping body 202 can form or provide a toothed surface 212. Regardless, the gripping body 202 can be assembled or mounted to the post 200 in a variety of fashions, for example via a bolt. In some embodiments, the gripping body 202 can be secured to the post 200 in manners that allow selective rotational or pivoting movement of the gripping body 202 relative to the post 200). In this regard, the post 200 and the gripping body 202 can each have an elongated shape as shown, with the elongated shape defining a central axis, respectively. In some examples, the gripping body 202 can be secured to the post 200 in a first rotational arrangement reflected by FIG. 2 in which the central axis of the gripping body 202 is substantially perpendicular to the central axis of the post 200. This perpendicular arrangement is conducive to engaging a tree trunk as described in greater detail below. FIG. 1 reflects the gripping body 202 secured to the post 200 in a second rotational arrangement in which the central axis of the gripping body 202 is substantially parallel with the central axis of the post 200. This parallel relationship can be conducive to storage and climbing. In some embodiments, an ability to rotate or pivot the gripping body 202 relative to the post 200 can be a highly desired feature that allows for ease of climbing and securement to a tree trunk. In other embodiments, connection between the post 200 and the gripping body 202 need not allow for rotation of the gripping body 202.

The post 200 is, in some examples, configured to provide a single mounting location for the gripping body 202. In other embodiments, the post 200 can be configured to provide two or more gripping body mounting locations along a length thereof. For example, the post 200 can optionally provide a series of holes along a length thereof and through which the bolt can be received. With this construction, the gripping body 202 can be secured to the post 200 at any of the holes (via the bolt) as desired by the user (e.g., that provides a best "fit" for a particular tree trunk).

Figure 4:
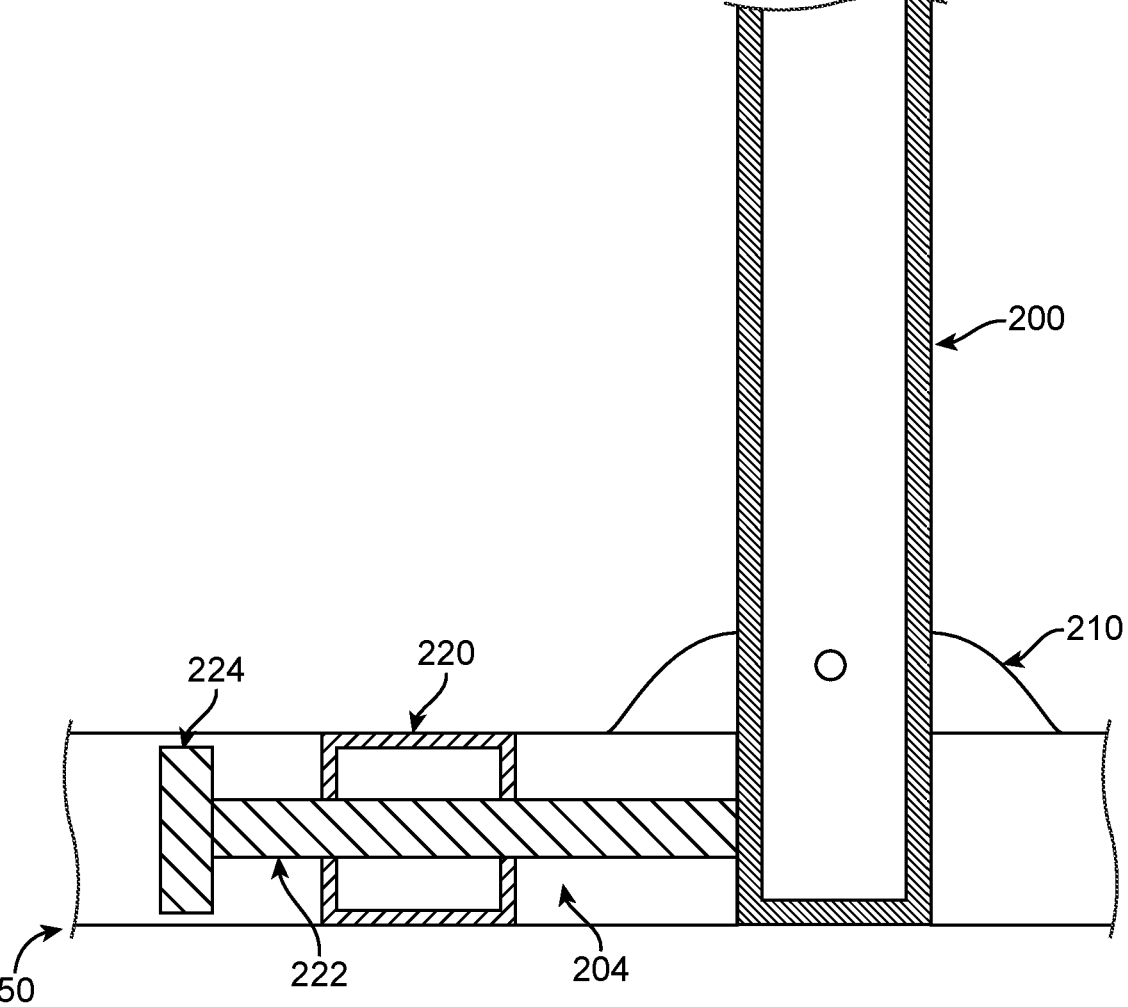
FIG. 4 is an enlarged, simplified cross-sectional view of a portion of the climbing platform device of FIG. 2.

The stabilizing mechanism 204 is generally configured to resist overt rotation of the post 200 relative to the platform 50 in the raised position of the post 200, and can assume various forms. In some embodiments, and as shown in FIG. 4, the stabilizing mechanism 204 includes a cross member 220, a shaft 222, and a grip 224. The cross member 220 is attached to and extends between the intermediate lateral frame members 64, 66 at a location proximate the brackets 210. The cross member 220 defines a passageway sized to receive the shaft 222, for example via a threaded engagement. The grip 224 is attached to the shaft 222, and provides a convenient surface for grasping by a user. With this construction, a user can apply a rotational force onto the grip 224, causing an engagement end of the shaft 222 to move longitudinally. As the post 200 is rotated relative to the platform 50 from the lowered position of FIG. 1 to the raised position of FIG. 2, the post 200 is brought into contact with the engagement end of the shaft 222 (as shown in FIG. 4), preventing further rotation. In the raised position, then, where the gripping body 202 is secured against a rigid structure (e.g., a tree trunk) and a moment force is applied to the platform 50 (e.g., by a user's weight on the platform 50), an interface between the stabilizing mechanism 204 and the post 200 prevents the platform 50 from further rotating relative to the post 200 (and thus relative to the rigid structure/tree trunk). A user can attain a desired angle of the platform 50 relative to the post 200 (when in the raised position), and thus relative to the rigid structure/tree trunk, by moving the shaft 222 as described above via rotation of the grip 224. In other embodiments, a more permanent structure can be provided that resists rotation of the platform 50 relative to the post 200 in the raised position.

Returning to FIGS. 1 and 2, the catch 206 is carried by the post 200 and includes or provides surfaces or features configured to conveniently engage the first strap 24. For example, the catch 206 can include a button or knob-shaped body about which the first strap 24 can be wrapped and secured. Other shapes or configurations are equally acceptable. Regardless, the catch 206 serves as an attachment point for the first strap 24 relative to the climbing platform assembly 22. The catch 206 can be assembled or mounted to the post 200 in a variety of fashions, for example via a bolt, weld, etc. In some embodiments, the post 200 is configured to provide a single mounting location for the catch 206 as shown. In other embodiments, the post 200 can provide two or more mounting locations along a length thereof for the catch 206. For example, the bolt can be configured for mounting to any of the optional holes in the post 200 as described above. With this optional construction of the post 200, the catch 206 can be secured to the post 200 at any of the holes as desired by the user (e.g., that provides a best "fit" for a particular tree trunk).

The capture member 208 is carried by the post 200 and includes or provides surfaces or features configured to conveniently engage the second strap 26. For example, the capture member 208 can be, or can be akin to, an eyelet bolt, providing features conducive to receiving hooks carried by the second strap 26. Other configurations are equally acceptable. Regardless, the capture member 208 serves as an attachment point for the second strap 26 relative to the climbing platform assembly 22. The capture member 208 can be assembled or mounted to the post 200 in a variety of fashions, for example via a nut, weld, etc. In some embodiments, the post 200 is configured to provide a single mounting location for the capture member 208 as shown. In other embodiments, the post 200 can provide two or more mounting locations along a length thereof for the capture member 208. In some embodiments, the catch 206 and the capture member 208 are arranged to extend or project from an opposite sides of the post 200. In other embodiments, one or both of the catch 206 and the capture member 208 can be omitted.

The platform assembly 40, the trunk capture assembly 42, and the post assembly 44 are secured to one another as described above, forming the climbing platform device 22 as a single, integrated product. In some embodiments, the climbing platform device 22 is lightweight, for example on the order of 6 pounds or less (although other weights are also acceptable), and is thus highly portable. Moreover, and with reference to FIG. 1, the climbing platform device 22 can be arranged to the stowing state (i.e., arms 130, 132 and the post 200 are parallel or "flat" with the platform 50; the gripping body 202 is parallel with the post 200) for compact transport by a user. The cable 134 can optionally be employed as a convenient "handle" or "strap" for carrying the climbing platform assembly 22. The one or more securing lines 24, 26 are also lightweight and easily carried the user.

As mentioned above, components of the climbing platform device 22 can be formed in various manners. For example, the platform 50 can be cast-formed (e.g., cast aluminum), welded (e.g., separately formed and welded together metal square tubes), CNC parts assembled together, CNC as a single or integral body, etc.

The climbing platform devices of the present disclosure can optionally include or carry one or more additional features. For example, and as shown in FIG. 1, an optional tether 250 (e.g., string, rope, paracord, etc.) can be provided with the platform 50; one end of the tether 250 is secured to the platform 50. In some embodiments, the platform 50 can include or carry features, for example clips 254, that facilitate winding of the tether 250 in close proximity to the platform 50 in the stowing state of FIG. 1. As a point of reference, the tether 250 is omitted from the view of FIG. 2 for ease of illustration. The tether 250 can be extended from the platform 50 as desired, with a second end thereof available for connection to a user (e.g., connected to an optional harness device that is otherwise worn by a user). With these and related embodiments, the climbing platform device 22 can be connected at all times to a user via the tether 250 when climbing/descending.

Figure 5:
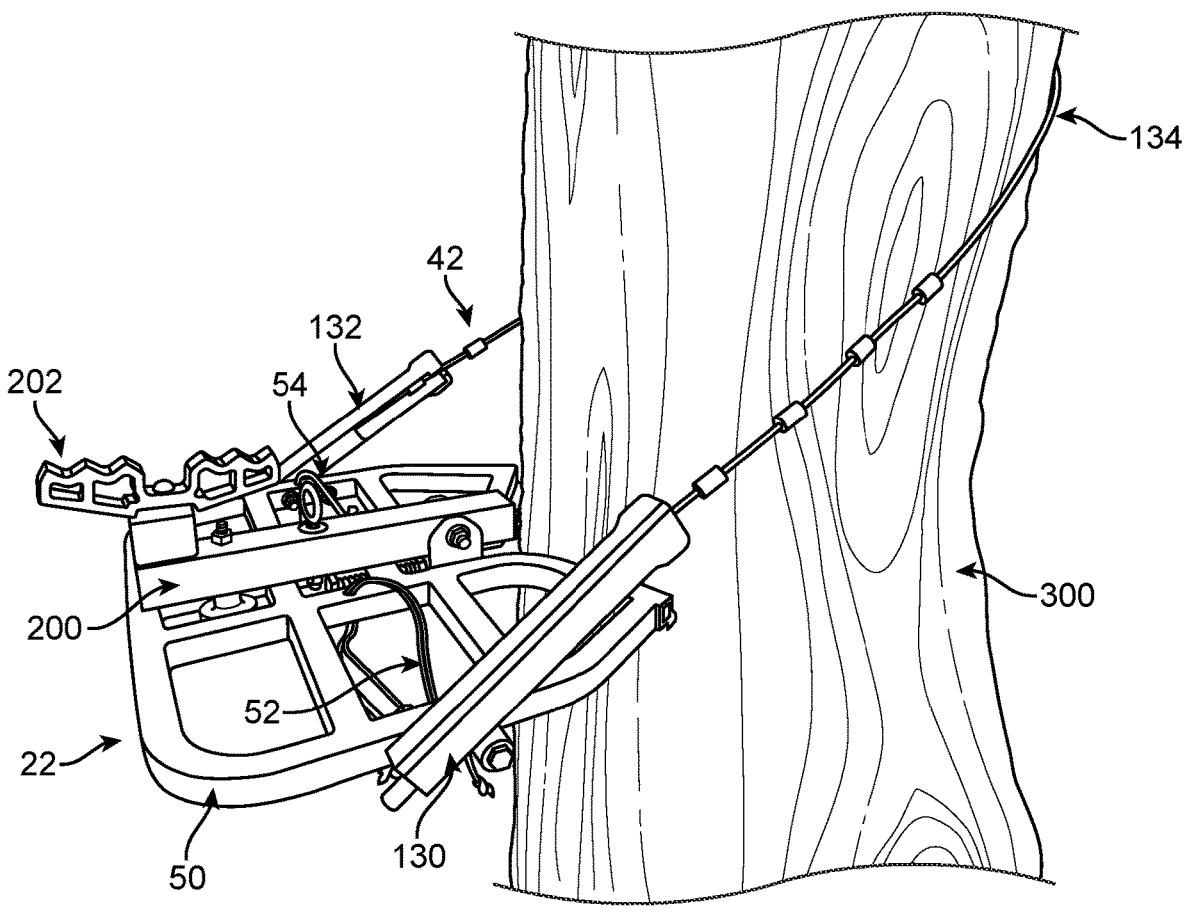
FIGS. 5-8 illustrate use of the climbing platform devices and climbing tree stand systems of the present disclosure.

The climbing platform devices of the present disclosure can be employed by a user to ascend (and descend) a tree trunk. FIG. 5 depicts an initial stage of use, with the climbing platform device 22 arranged in the climbing state and connected to a tree trunk 300. In particular, the cable 134 has been looped about the tree trunk 300 and connected to each of the arms 130, 132, with the arms 130, 132 having been rotated relative to the platform 50 as shown. The post 200 is in the lowered position relative to the platform 50 so as to present minimal interference to a user intending to ascend the tree trunk 300. A different position of the post 200 could impede or prevent climbing by creating injury-prone pressure on the user's feet or ankles. A length of the cable 134 (extending between the arms 130, 132) can readily be adjusted to whatever length the user deems comfortable for climbing by selecting a desired one of the series of anchors 152 for coupling to a corresponding one of the arms 130, 132 as described above). In more general terms, a user can select a length of the cable 134/position of the platform 50 relative to the tree trunk 300 that is conducive to climbing and does not create injury-prone pressure on the user's feet or ankles. In the arrangement of FIG. 5, the platform 50 is loosely maintained by the cable 134 against the tree trunk 300; the trunk capture assembly 42 prevents the platform 50 from falling to the ground, but permits some movement of the platform 50 away from the tree trunk 300 as described below. Though not shown, it is recommended that a user wear a separate harness device when using the climbing platform device 22 to climb the tree 300. The harness device can be provided entirely separately from the platform devices and climbing tree stand systems (e.g., the tree stand system 20 of FIG. 1) and can have any form known in the art. The harness device is secured to the user and the tree trunk 300. Though not recommended, in other embodiments, the user may choose to use the climbing platform device 22 without a separate harness.

The climbing platform device 22 can then be employed by the user to ascend or climb the tree trunk 300. With the climbing platform device 22 in the climbing state, feet of the user are secured to the platform 50 via the foot hold members 52, 54. Once secured to and standing on the platform 50 with his/her legs straight, the user can pull his/her feet slightly outwardly away from the tree trunk 300 and then lift the platform 50 upwardly by bending at the knees. A length of the cable 134 about the tree trunk 300 permits this motion to occur. The user then pivots his/her feet and pushes the platform 50 back into engagement with the tree trunk 300. With the platform 50 now at a higher position along the tree trunk 300, the user returns to a standing position. The gripping surfaces 106 (hidden in FIG. 5 but shown, for example, in FIG. 1) provide a robust engagement with the tree trunk 300, allowing the user to more easily achieve a standing position. Having now attained a higher elevation, the user can the repeat this same climbing process. The harness device, if worn by the user, can be repositioned along the tree trunk 300 as desired.

Figure 6:
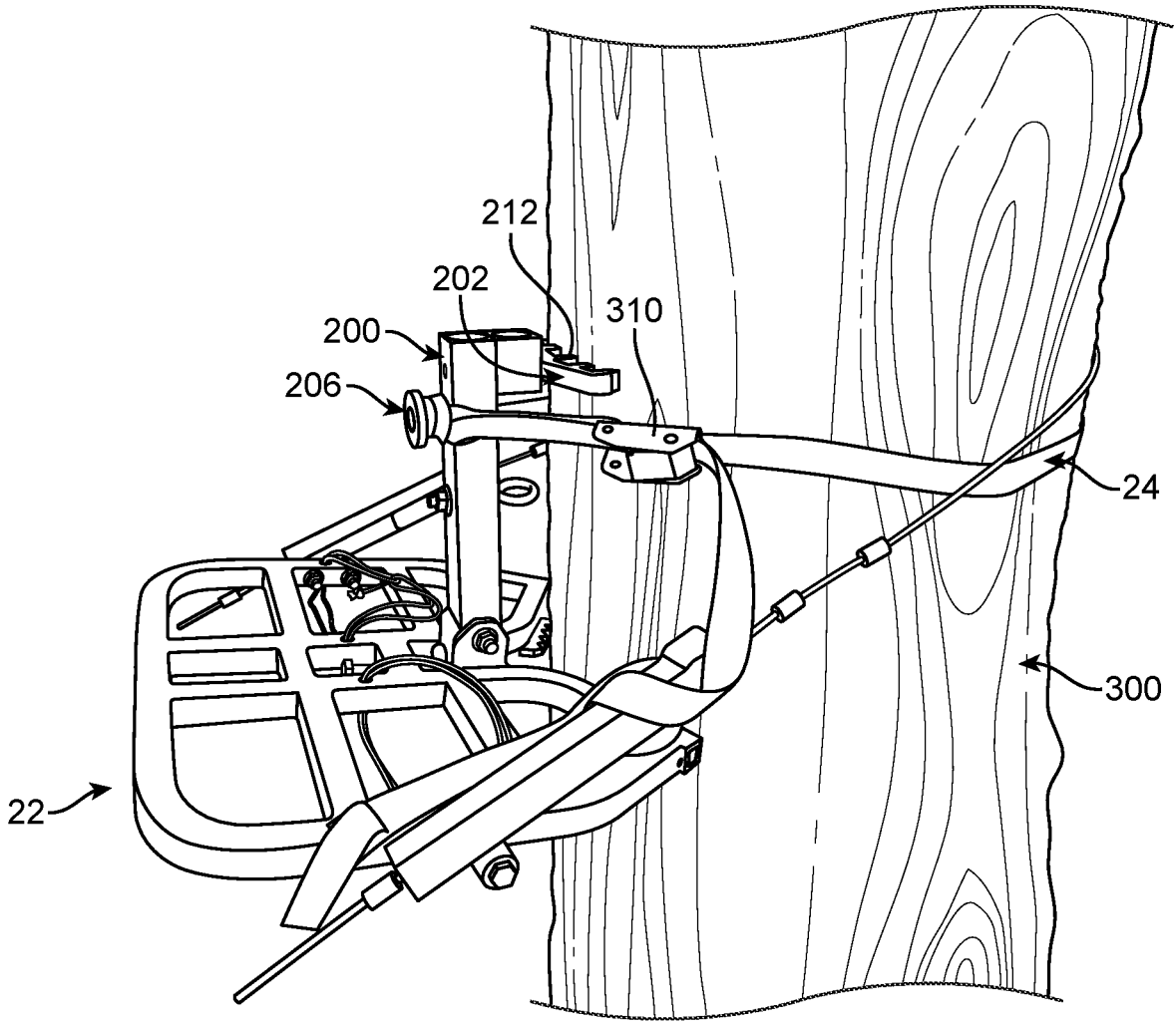

Once the user has reached a desired elevation, the climbing platform device 22 is transitioned to the mounting state, depicted in FIG. 6, by rotating the post 200 to the raised position and bringing the toothed surface 212 of the gripping body 202 into engagement with the tree trunk 300. As a point of reference, with embodiments in which the gripping body 202 can be rotated relative to the post 200, the gripping body 202 can be manipulated to the perpendicular arrangement prior to raising the post 200. With the gripping body 202 in contact with the tree trunk 300, the first securing line 24 can be wrapped about the tree trunk 300 and secured to the catch 206. In some embodiments, an optional ratchet mechanism 310 can be provided with the first securing line 24 and operated by the user to tighten.

Figure 7:
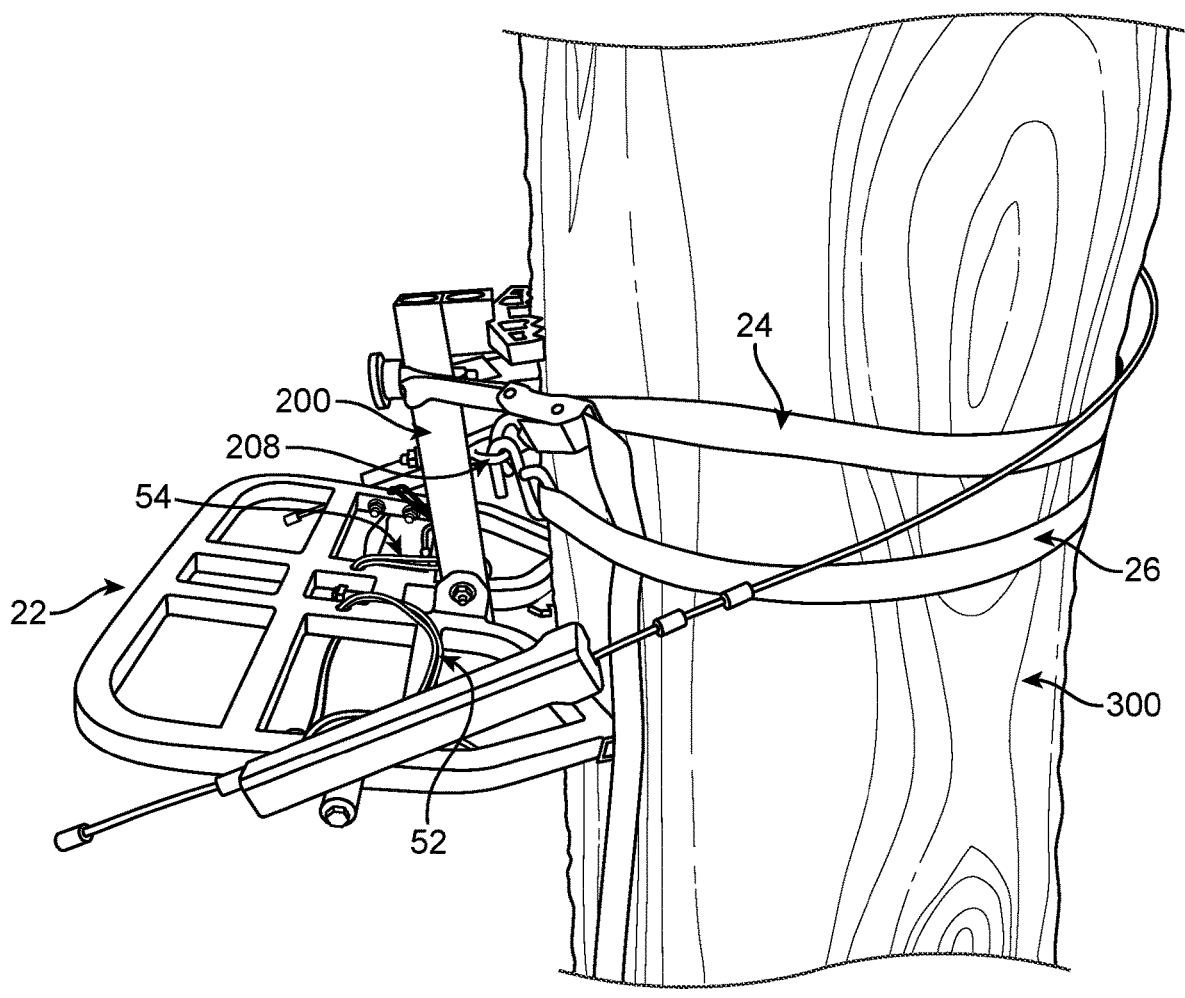

With reference to FIG. 7, the optional second securing line 26, where provided, could similarly be wrapped about the tree trunk 300 and secured to the post 200. In some embodiments, the second securing line 26 can be connected to the capture member 208. In other optional embodiments, the second securing line 26 could be wrapped over the post 200 and tightened (e.g., via a ratchet mechanism (not shown)). Regardless, upon final assembly and as depicted in FIGS. 6 and 7, the climbing tree stand system 20 is secured to the tree trunk 300, with the at least the first securing line 24 applying substantive side pressure onto the post 200, rigidly securing the climbing platform device 22 to the tree trunk 300. When used in conjunction with the first securing line 24, the optional second securing line 26 can more strongly tighten the climbing platform device 22 to the tree trunk 300 to allow the user to apply side pressure to the climbing platform device 22. When applying side pressure to the climbing platform device 22, the user can pivot around the tree trunk 300 (e.g., while being connected to the tree by the harness device).

Figure 8:
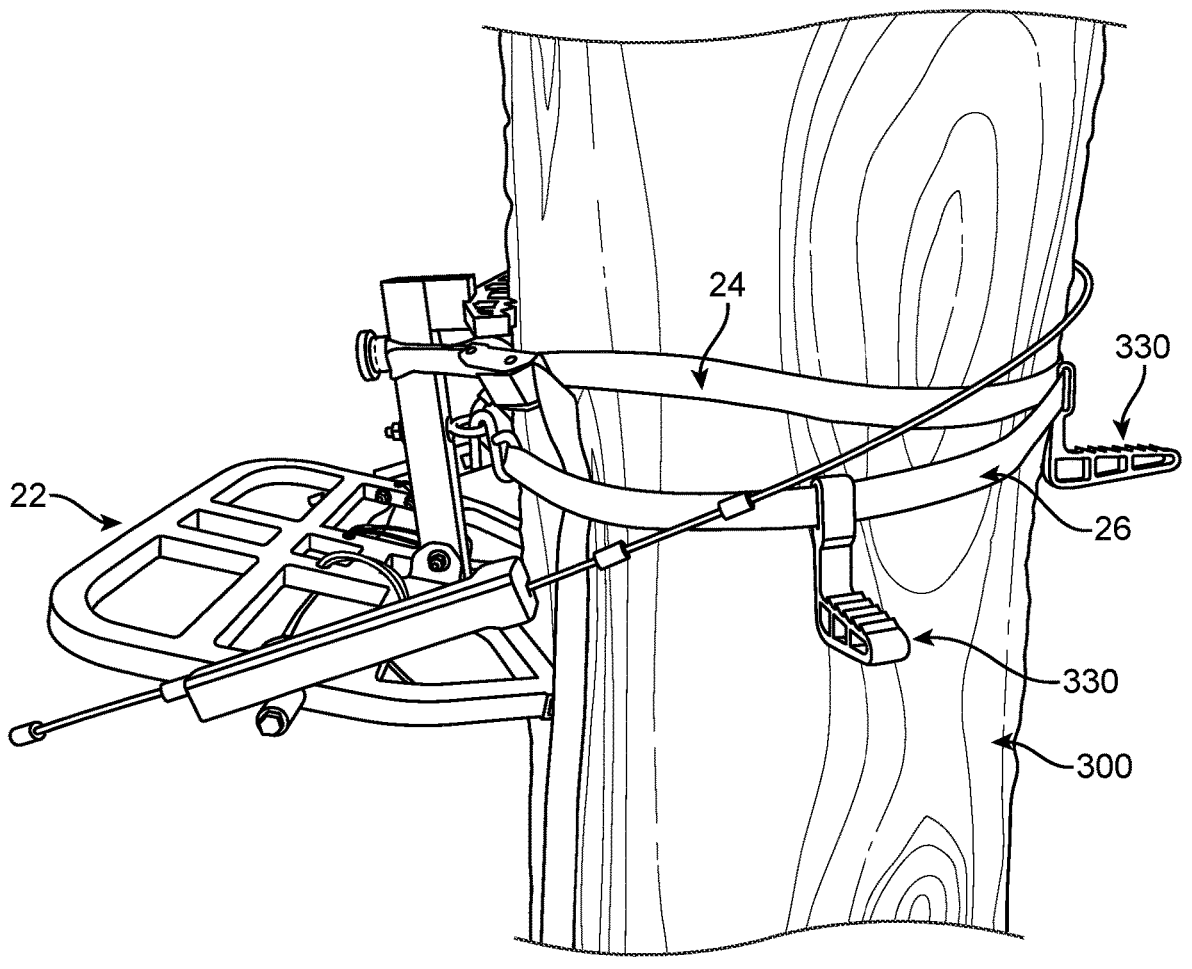

With the climbing platform device 22 secured to the tree trunk 300, the user can remove his/her feet from the foot hold members 52, 54 and freely move about the tree trunk 300 as desired (it being understood that the user can remain connected to/hang from the tree trunk 300 by the harness device (not shown)). The platform 50 remains as an available surface for the user's feet as needed. As show in FIG. 8, the climbing tree stand systems of the present disclosure can further include one or more steps 330 assembled to the second securing line 26 (or the first securing line 24) and secured about the tree trunk 300. Where provided, the circumferentially spaced steps 330 are available for the user's feet as desired.

Descending the tree trunk 300 can entail reversal of the steps described above with respect to FIGS. 5-7.

The climbing platform devices and climbing tree stand systems of the present disclosure provide a marked improvement over previous designs. The climbing platform device is effectively a one-piece device that is compact, lightweight and easily transportable, and affords a user the ability to quickly ascend a tree with minimal set-up or effort. For example, a separate ladder or climbing steps are not required. Further, when used with a harness device, a user (e.g., bow hunter) can comfortably view the surrounding area from an elevated location for extended periods, and can easily move about or around the tree trunk (e.g., a bow hunter can shoot or hide from any location about the tree trunk). The user is always safely connected to the tree trunk by tension/the harness device.

Although the present disclosure has been described with reference to preferred embodiments, workers skilled in the art will recognize that changes can be made in form and detail without departing from the spirit and scope of the present disclosure.

What is claimed is:

1. A climbing platform device for enabling a user to climb a tree to an elevated position, the climbing platform device comprising:
   a platform assembly including a platform;
   a trunk capture assembly including a first arm, a second arm, and a cable;
   wherein the first and second arms are connected to the platform, and the cable is extendable between the first and second arms; and
   a post assembly including a post connected to the platform and a gripping body connected to the post;
   wherein the climbing platform device is transitionable between a stowing state, a climbing state, and a mounting state, wherein at least the mounting state includes:
      the gripping body arranged to contact a first region of a tree trunk, and
      the cable extending from the first and second arms spatially beyond the platform and free of the post assembly to loop about the tree trunk and engage a second region of the tree trunk opposite the first region.

2. The climbing platform device of claim 1, wherein the stowing state includes the first arm, the second arm, and the post arranged substantially parallel to the platform.

3. The climbing platform device of claim 2, wherein the climbing state includes the post arranged substantially parallel to the platform, and the first and second arms arranged to project away from the platform.

4. The climbing platform device of claim 3, wherein the mounting state includes the post arranged substantially perpendicular to the platform, and the first and second arms arranged to project away from the platform.

5. The climbing platform device of claim 1, wherein the platform assembly further includes first and second foot hold members secured to the platform.

6. The climbing platform device of claim 1, wherein the trunk capture assembly is configured to selectively alter a length of the cable between the first and second arms.

7. The climbing platform device of claim 6, wherein the cable includes a cable body and a plurality of anchors disposed along a length of the cable body, and further wherein the first and second arms are configured to selectively capture respective ones of the anchors.

8. The climbing platform device of claim 6, wherein the climbing platform device is configured such that the cable is releasable from at least one of the first and second arms.

9. The climbing platform device of claim 1, wherein the gripping body is pivotably connected to the post.

10. The climbing platform device of claim 1, further comprising a shoulder body projecting from the platform and arranged to contact the first arm.

11. The climbing device of claim 1, further comprising a stabilizing mechanism configured to resist movement of the post relative to the platform in a raised position of the post.

12. The climbing device of claim 1, wherein the first and second arms are pivotably connected to the platform.

13. The climbing device of claim 1, wherein the post is pivotably connected to the platform.

14. A climbing tree stand system for enabling a user to climb a tree to an elevated position and stand at the elevated position, the system comprising:
   a climbing platform device comprising:
      a platform assembly including a single platform,
      a trunk capture assembly including a first arm, a second arm, and a cable,
      wherein the first and second arms are connected to the platform, and the cable is extendable between the first and second arms,
      a post assembly including a post connected to the platform,
      wherein the climbing platform device is transitionable between a stowing state, a climbing state, and a mounting state; and
   a first securing line for securing the climbing platform device, in the mounting state, to a tree trunk;
   wherein the climbing tree stand system is free of any additional user-support platforms apart from the single platform, and further wherein the climbing tree stand system is configured such that the climbing state includes the cable extending around a tree trunk opposite the single platform and all forces applied by a user onto the system to ascend the tree trunk are transmitted through the single platform.

15. The climbing tree stand system of claim 14, wherein the climbing platform device further includes a catch, and further wherein the first securing line is configured to be selectively secured to the catch.

16. The climbing tree stand system of claim 15, wherein the catch is carried by the post.

17. The climbing tree stand system of claim 14, further comprising a second securing line for securing the climbing platform device, in the mounting state, to a tree.

18. The climbing tree stand system of claim 17, wherein the climbing platform device further includes first and second capture bodies configured to selectively receive a corresponding one of the first and second securing lines.

19. The climbing tree stand system of claim 14, wherein the first and second arms are pivotably connected to the platform, and further wherein the post is pivotably connected to the platform.

20. A climbing platform device for enabling a user to climb a tree to an elevated position, the climbing platform device comprising:
   a platform assembly including a platform;
   a trunk capture assembly including a first arm, a second arm, and a cable;
   wherein the first and second arms are connected to the platform, and the cable is extendable between the first and second arms; and
   a post assembly including a post connected to the platform;
   wherein the climbing platform device is transitionable between a stowing state, a climbing state, and a mounting state, and further wherein:
      the stowing state includes the first arm, the second arm, and the post arranged substantially parallel to the platform, and
      the climbing state includes the post arranged substantially parallel to the platform, and the first and second arms arranged to project away from the platform.

* * * * *